(No Model.)

C. L. FERRIOTT.
COMBINED COTTON CHOPPER AND CULTIVATOR.

No. 360,214. Patented Mar. 29, 1887.

WITNESSES:
Chas. O. Vida
C. Sedgwick

INVENTOR:
C. L. Ferriott
BY Munn & Co.
ATTORNEYS.

UNITED STATES PATENT OFFICE.

CHARLIE L. FERRIOTT, OF ARMOUR, TEXAS.

COMBINED COTTON CHOPPER AND CULTIVATOR.

SPECIFICATION forming part of Letters Patent No. 360,214, dated March 29, 1887.

Application filed October 15, 1886. Serial No. 216,338. (No model.)

*To all whom it may concern:*

Be it known that I, CHARLIE L. FERRIOTT, of Armour, in the county of Limestone and State of Texas, have invented a new and useful Improvement in Combined Cotton Choppers and Cultivators, of which the following is a full, clear, and exact description.

Reference is to be had to the accompanying drawings, forming a part of this specification, in which similar letters of reference indicate corresponding parts in all the figures.

Figure 1:
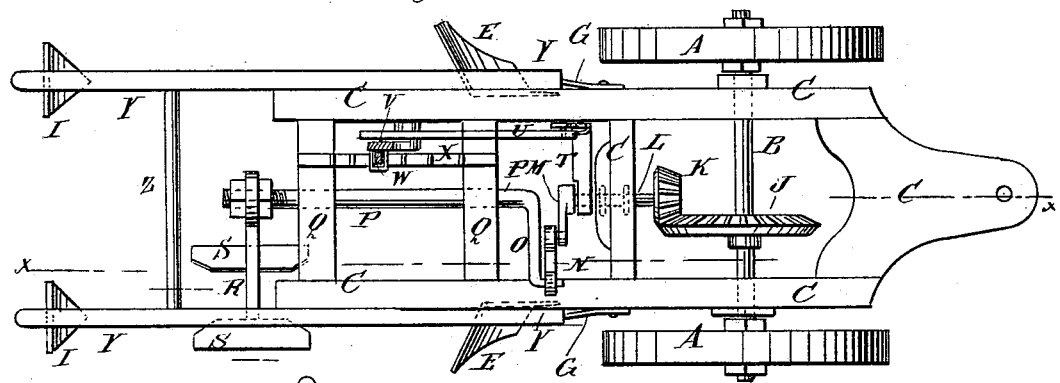
Figure 2:
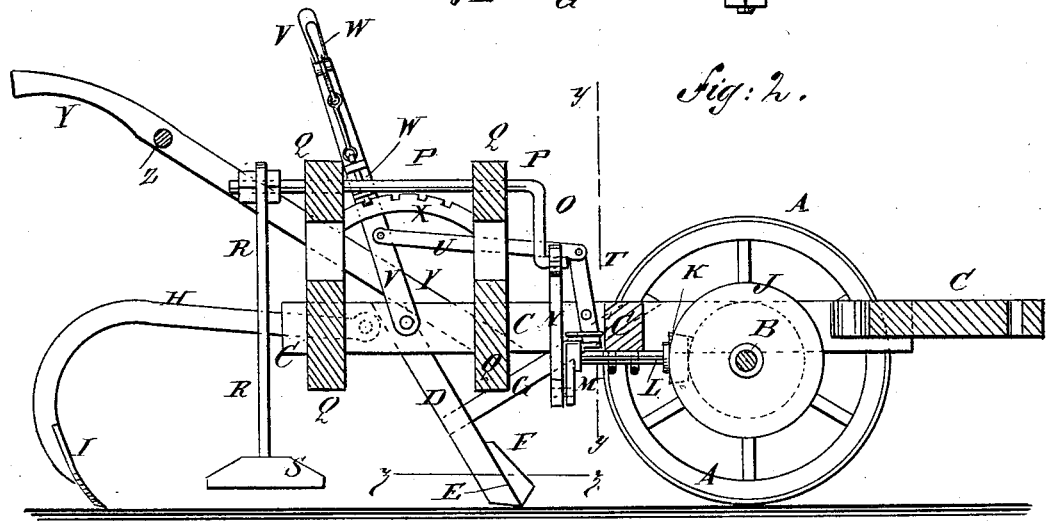
Figures 3, 4:
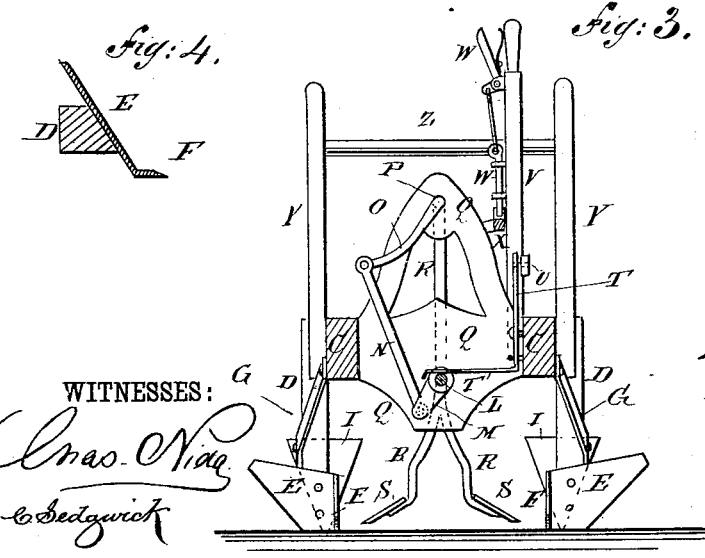
Figure 5:
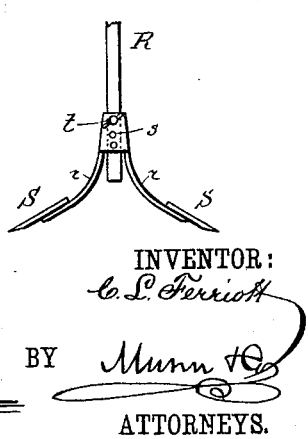

Figure 1 is a plan view of my combined cotton chopper and cultivator. Fig. 2 is a sectional side elevation of the same, taken through the broken line $x\ x$, Fig. 1. Fig. 3 is a sectional front elevation of the same, taken through the line $y\ y$, Fig. 2. Fig. 4 is a sectional plan view of one of the barring-off plows, taken through the line $z\ z$, Fig. 2; and Fig. 5 is a detail view of the chopping-hoes.

The object of this invention is to provide combined cotton choppers and cultivators constructed in such a manner as to bar off the rows of plants, chop the plants to a stand, and dirt the standing plants at one passage along the said rows, and which shall be simple in construction, conveniently controlled, and reliable in operation.

The invention consists in the construction and combination of various parts of the machine, as will be hereinafter fully described and then claimed.

A are the wheels, the axle B of which revolves in bearings attached to the forward parts of the side bars of the frame C. To the rear parts of the side bars of the frame C are attached the upper ends of plow-standards D, to the lower ends of which are attached the barring-off plows E. Upon the inner edges of the plows E are formed forwardly-projecting colters F, to separate the soil moved by the said plows from the soil around the plants, to prevent the said plants from being uprooted by the tearing away of the soil. The draft-strain upon the standards D is sustained by the braces G, the rear ends of which are attached to the middle parts of the said standards D and their forward ends are attached to the side bars of the frame C.

To the rear ends of the side bars of the frame C are bolted or otherwise secured the forward ends of the plow-beams H, the rear parts of which are curved downward, and to their ends are attached plows I, by which the plants are dirted as the machine is drawn forward.

To the axle B is attached a large beveled gear-wheel, J, the teeth of which engage with the teeth of the beveled pinion-wheel K, attached to the forward end of the short shaft L. The shaft L revolves and slides in bearings attached to the cross-bar of the frame C, and to its rear end is attached a short crank, M, to which is pivoted the lower end of the connecting-rod N. The upper end of the connecting-rod N is pivoted to the crank O, formed upon or attached to the forward end of the shaft P, which rocks in bearings in the upper ends of brackets or standards Q, secured to and between the side bars of the frame C. The crank O is made so much longer than the crank M that the revolution of the shaft L will only rock the shaft P.

To the rear end of the shaft P is rigidly attached the upper end of the handle R, the lower end of which carries a forked shank, $r$, to the end of each branch of which is attached, or upon it is formed, a chopping-hoe, S. The hoes S incline from each other, as shown in Fig. 3, so that one hoe S will be in a working position when the handle R is swung toward one side and the other hoe S will be in working position when the said handle is swung toward the other side. The upper end of the shank $r$ is socketed, and in it is a series of apertures, $s$, by means of a pin, $t$, passed through one of which apertures and a hole in the handle R the height of the hoes can be regulated.

T is an elbow-lever, the upper arm of which, near the angle of the said lever, is pivoted to the side bar of the frame C. The lower arm of the elbow-lever T engages with the shaft L, so that by operating the said elbow-lever the said shaft can be moved longitudinally to throw the pinion-wheel K out of or into gear with the gear-wheel J, and thus stop or start the chopping-hoes.

To the end of the upper arm of the elbow-lever T is pivoted the forward end of the connecting-rod U, the rear end of which is pivoted to the lever V. The lower end of the lever V is pivoted to the side bar of the frame C, and its upper end projects into such a position that it can be readily reached and operated by the plowman to throw the chopping-hoes into and out of gear. The lever V is provided with a spring lever-pawl, W, which engages with the recessed catch-bar X, attached at its ends to the standards Q, to hold the said lever V in any position into which it may be adjusted.

The machine is guided by means of handles Y, the forward ends of which are attached to the side bars of the frame C, and their rear parts are connected by a round, Z.

With this construction, as the machine is drawn forward, the row of plants is barred off by the plows E F, the plants are chopped to a stand by the hoes S, and the standing plants are dirted by the plows I. With this construction, also, should the plants in any part of the row be so thin as not to need chopping, the hoes can be instantly thrown out of gear and again thrown into gear when the plants become thicker.

Having thus described my invention, what I claim as new, and desire to secure by Letters Patent, is—

In a cotton-chopper, the frame, the axle having drive-wheels, and a bevel-gear, J, in combination with the longitudinally-sliding gear-shaft L, having short crank M on its rear end, the bar N, the longitudinal rock-shaft P in rear of and above the shaft L and having the long crank O, the handle R, depending from the rear end of the rock-shaft, and the opposite chopping-hoes S, substantially as set forth.

C. L. FERRIOTT.

Witnesses:
G. J. GILLESPIE,
LEE MORGAN.